(12) United States Patent
Orihara

(10) Patent No.: US 10,547,111 B2
(45) Date of Patent: Jan. 28, 2020

(54) METHOD FOR MANUFACTURING ANTENNA DEVICE, AND ANTENNA DEVICE

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 129 days.

(21) Appl. No.: 15/576,451

(22) PCT Filed: May 2, 2016

(86) PCT No.: PCT/JP2016/063572
§ 371 (c)(1),
(2) Date: Nov. 22, 2017

(87) PCT Pub. No.: WO2016/190055
PCT Pub. Date: Dec. 1, 2016

(65) Prior Publication Data
US 2018/0212326 A1    Jul. 26, 2018

(30) Foreign Application Priority Data
May 27, 2015    (JP) .................. 2015-106946

(51) Int. Cl.
*H01Q 7/06* (2006.01)
*G06K 19/077* (2006.01)
*H01Q 1/22* (2006.01)

(52) U.S. Cl.
CPC ......... *H01Q 7/06* (2013.01); *G06K 19/07779* (2013.01); *H01Q 1/2216* (2013.01); *H01Q 1/2225* (2013.01)

(58) Field of Classification Search
CPC ....... H01Q 7/06; H01Q 1/2216; H01Q 1/2225
See application file for complete search history.

(56) References Cited

U.S. PATENT DOCUMENTS

2015/0236418 A1* 8/2015 Ito ..................... H01Q 7/06
343/788

FOREIGN PATENT DOCUMENTS

JP          4013987 B1    11/2007
JP       2011-229133 A    11/2011
(Continued)

OTHER PUBLICATIONS

Jun. 14, 2016 International Search Report submitted within International Patent Application No. PCT/JP2016/063572.
(Continued)

*Primary Examiner* — Hoang V Nguyen
(74) *Attorney, Agent, or Firm* — Oliff PLC

(57) ABSTRACT

An antenna device and method for manufacturing an antenna device, which can be bent to be cohered to installed position, and in which magnetic sheets can be mounted easily is provided. A method for manufacturing an antenna device incorporated in an electronic apparatus and communicating with an external device via an electromagnetic field signal, including arranging magnetic sheets on mutually different surfaces of one side part and other side part of an antenna coil, with respect to the antenna coil arranged by winding around a conducting wire such that parts of the conducting wire opposing in width direction via an opening will be close to each other, and divided into two parts; and pressing the antenna coil provided with the magnetic sheets in laminated direction.

9 Claims, 11 Drawing Sheets

(56) References Cited

FOREIGN PATENT DOCUMENTS

| | | |
|---|---|---|
| JP | 4894945 B2 | 3/2012 |
| JP | 2013-081072 A | 5/2013 |
| JP | 5472153 B2 | 4/2014 |
| JP | 2014-078847 A | 5/2014 |
| WO | 2014/057920 A1 | 4/2014 |
| WO | 2015-068473 A1 | 5/2015 |

OTHER PUBLICATIONS

May 21, 2019 Office Action issued in Chinese Patent Application No. 201680027467.2.
Oct. 30, 2019 Office Action issued in Chinese Patent Application No. 201680027467.2.

* cited by examiner

METHOD FOR MANUFACTURING ANTENNA DEVICE, AND ANTENNA DEVICE

BACKGROUND OF THE INVENTION

Field of the Invention

The present invention relates to a method for manufacturing an antenna device incorporated in an electronic apparatus and communicating with an external device such as a transmitter via an electromagnetic field signal, and an antenna device manufactured by this manufacturing method. The present application claims priority based on Japanese Patent Application Nos. 2015-106946 filed in Japan on May 27, 2015, which is incorporated by reference herein.

Description of Related Art

In electronic apparatuses such as portable telephone, an antenna module for RFID (Radio Frequency Identification) has been used to mount a function of Near Field Communication. This antenna module communicates with an antenna coil mounted on a transmitter such as a reader/writer by using inductive coupling. That is, in this antenna module, a magnetic field from the reader/writer is received by an antenna coil and thereby converted into electric power, which can drive an IC which functions as a communication processing unit.

To reliably perform communication, the antenna module is required to receive, at the antenna coil, magnetic flux equal to or more than a certain value from the reader/writer. For this reason, in an antenna module according to a conventional example, a loop coil is provided in a housing of a portable telephone, and this coil receives magnetic flux from the reader/writer. In the antenna module incorporated in an electronic apparatus such as a portable telephone, magnetic flux from the reader/writer are caused to bounce back by eddy current occurring because the metal of a substrate, battery pack, or the like inside the apparatus receives a magnetic field from the reader/writer. For example, when considering with a housing surface of the portable telephone, the magnetic field coming from the reader/writer tends to be strong at an outer circumferential portion of the housing surface and weak at a portion near the center of the housing surface.

For an antenna using a normal loop coil, the loop coil has an opening which is positioned at a center portion of the portable telephone where a magnetic field passing through the above-described outer circumferential portion of the housing surface is not much received. Thus, in the antenna using the normal loop coil, efficiency of receiving magnetic field is poor.

For example, in Patent Literature 1, as means for enhancing reception sensitivity capable of surface-mounting on a circuit board of a portable telephone terminal, an antenna device in which a magnetic core is having a bend at least at an end thereof for bending magnetic flux transmitting along a principal surface of the circuit board which arrives at an opening of an antenna coil, and a magnetic flux is bent to a side of the circuit board by this bend to go around to a side surface of the circuit board, is described.

In addition, in Patent Literature 2, an antenna device comprising an antenna coil and a magnetic core, wherein a magnetic core is extended along a side surface from a principal surface of a battery pack, is described.

In addition, in Patent Literature 3, as means for enhancing communication performance by increasing magnetic field coupling with an antenna of a communication partner, an end of a magnetic core in which magnetic flux enters and exits is formed wider than other part, is described.

Patent Literature 1: JP 4013987 B
Patent Literature 2: JP 5472153 B
Patent Literature 3: JP 4894945 B

SUMMARY OF THE INVENTION

According to communication direction or a type of an electronic apparatus to install an antenna device, there is a case that it is effective to install the antenna device for example by bending the antenna device along an end of a LCD module or a battery, as it is possible to install the antenna device compactly in limited space. In this case, when a magnetic sheet is mounted by inserting into an opening of an antenna coil, a thickness of the magnetic sheet is added to a thickness of the antenna coil, so it will be in so-called R shape in which flexure occurs to the antenna device when it is bent, and it was difficult to bend the antenna device, for example at a right angle along installed position.

In Patent Literatures 1 and 2, it is described that the magnetic core of the antenna device comprises the bend, but it is not described to bend the antenna device including the antenna coil and the magnetic sheet and about its concrete means.

In addition, in order to improve communication performance of the antenna device, there is a case to enlarge a size (width) of the magnetic sheet. However, when the magnetic sheet is enlarged, it was difficult to mount the magnetic sheet when it is inserted into an opening of the antenna coil.

In Patent Literature 3, it is described that the end of the magnetic core in which magnetic flux enters and exits is formed wider than other part, and that the magnetic core is inserted into a through hole of a coil conductor, but it is not described about means for mounting the magnetic core easily to the coil conductor even the magnetic core is in what kind of shape.

The present invention is proposed considering these circumstances, and the present invention provides a method for manufacturing an antenna device, which can be bent to be cohered to installed position, and in which magnetic sheets can be mounted easily, and the antenna device manufactured by this manufacturing method.

One embodiment of the present invention is a method for manufacturing an antenna device incorporated in an electronic apparatus and communicating with an external device via an electromagnetic field signal, comprising: an arrangement step for arranging magnetic sheets respectively on mutually different surfaces of one side part and other side part of an antenna coil, with respect to the antenna coil arranged by winding around a conducting wire such that parts of the conducting wire opposing in width direction via an opening will be close to each other, and divided into two parts, i.e. the one side part in which the conducting wire is wound around in one direction and the other side part in which the conducting wire is wound around in other direction, via a center line longitudinally traversing the opening in a longitudinal direction; and a pressing step for pressing the antenna coil provided with the magnetic sheets in laminated direction.

According to one embodiment of the present invention, by arranging and pressing the respective magnetic sheets separately, it is possible to mount the magnetic sheets easily without inserting into the opening of the antenna coil. In addition, by configuring such that boundary portion of the respective magnetic sheets are having flexibility, it is possible to bend the antenna device to be cohered to installed position.

At this time, in one embodiment of the present invention, the magnetic sheets arranged at the one side part and the other side part may be arranged such that respective one ends of the magnetic sheets will contact a center line.

By arranging the respective magnetic sheets to contact the center line of the opening and by pressing the respective magnetic sheets, it is possible to obtain the antenna device having flexibility capable of bending at the center line.

In addition, at this time, in one embodiment of the present invention, the magnetic sheets to be arranged at the one side part and the other side part may be arranged such that one end of one of the magnetic sheets overlaps with one end of other of the magnetic sheets.

In this case, it is possible to bend the antenna device with one end of a magnetic sheet laminated at lower side as supporting point, and further, there is no gap between the respective magnetic sheets, so magnetic field will not be leaked out.

In addition, at this time, in one embodiment of the present invention, the magnetic sheets to be arranged at the one side part and the other side part may be arranged such that one end of one of the magnetic sheets is spaced from one end of other of the magnetic sheets with a spacing equal to or less than a thickness of the respective magnetic sheets.

By arranging the respective magnetic sheets with a spacing equal to or less than a thickness of the respective magnetic sheets, more bendable antenna device can be achieved, and also, the antenna device almost free of magnetic field leakage can be achieved.

In addition, in one embodiment of the present invention, it may further comprise a magnetic sheet arranged at the opening, between the magnetic sheets of the one side part and the other side part.

As the above, for example when three magnetic sheets are arranged, boundary of the magnetic sheets will be located at two positions, so it is possible to configure as U-shape by bending at two positions along ends of the installed position.

In addition, in one embodiment of the present invention, a width in a longitudinal direction of at least one of the magnetic sheets may be wider than a width in a longitudinal direction of the opening.

By making the width of at least one of the magnetic sheets wider, it is possible to improve communication performance of the antenna device. In addition, in one embodiment of the present invention, the respective magnetic sheets are mounted on the antenna coil by pressing, so there is no limit in size of the magnetic sheets, not like the case that the magnetic sheet is inserted into the antenna coil.

In addition, in other embodiment of the present invention, an antenna device manufactured by the above method for manufacturing the antenna device, comprising: an antenna coil arranged by winding around a conducting wire such that parts of the conducting wire opposing in width direction via an opening will be close to each other, and divided into two parts, i.e. one side part in which the conducting wire is wound around in one direction and other side part in which the conducting wire is wound around in other direction, via a center line longitudinally traversing the opening in a longitudinal direction; and magnetic sheets respectively arranged on mutually different surfaces of the one side part and the other side part of the antenna coil, wherein boundary region between the magnetic sheets is having flexibility and configured to be bendable.

According to other embodiment of the present invention, respective magnetic sheets are mounted on mutually different surfaces of the one side part and the other side part of the antenna coil, so it is having flexibility bendable at boundary region of the respective magnetic sheets, and it is possible to bend, for example vertically to be cohered to installed position.

According to the present invention, by arranging and pressing respective magnetic sheets separately, it is possible to mount the magnetic sheets easily without inserting into the opening of the antenna coil. In addition, by configuring that boundary portion of the respective magnetic sheets is having flexibility, it is possible to bend the antenna device to be cohered to the installed position.

DETAILED DESCRIPTION OF THE INVENTION

Hereinafter, explaining in detail about preferred embodiments of the present invention in the following order. In addition, the embodiments explained in below will not unjustly limit the content of the present invention described in claims, and it is not limited that all the structures explained in the embodiments are necessary as means for solving the problem of the present invention.
1. Method for manufacturing antenna device
  1-1. Arrangement step
  1-2. Pressing step
2. Antenna device
<1. Method for Manufacturing Antenna Device>

A method for manufacturing an antenna device relating to one embodiment of the present invention is a method for manufacturing an antenna device 1 incorporated in an electronic apparatus 30 (refer to FIG. 8) and communicating with an external device via an electromagnetic field signal, comprising: an arrangement step for arranging magnetic sheets 20a1, 20a2 respectively on mutually different surfaces of one side part 12a1 and other side part 12a2 of an antenna coil 12, with respect to the antenna coil 12 arranged by winding around a conducting wire such that parts of the conducting wire opposing in width direction via an opening 12b will be close to each other, and divided into two parts, i.e. the one side part 12a1 in which the conducting wire is wound around in one direction and the other side part 12a2 in which the conducting wire is wound around in other direction, via a center line L longitudinally traversing the opening 12b in a longitudinal direction; and a pressing step for pressing the antenna coil 12 provided with the magnetic sheets 20a1, 20a2 in laminated direction.

Figure 1:
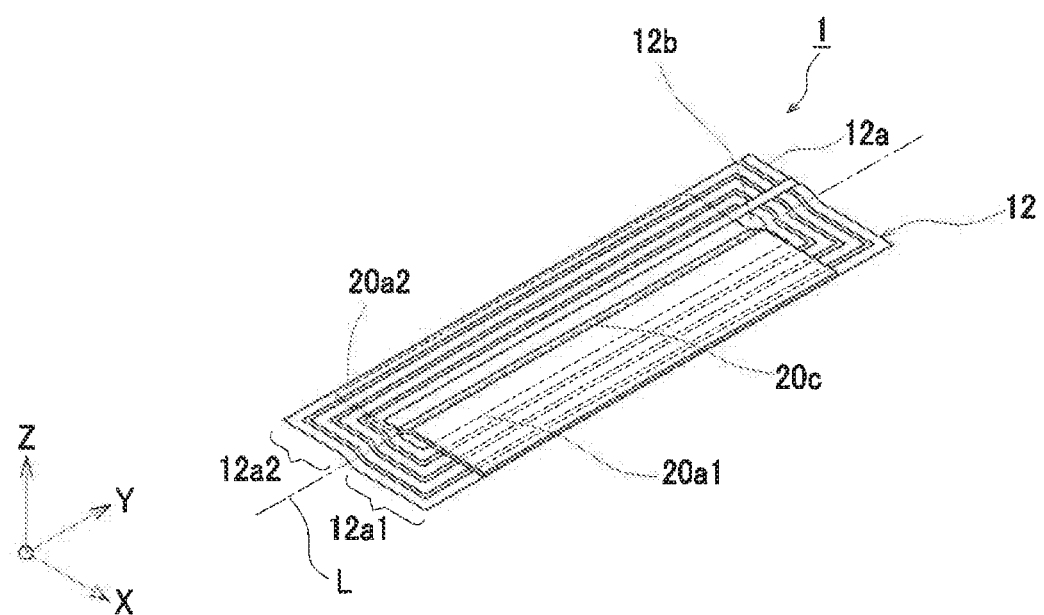
FIG. 1 is a perspective view illustrating a schematic structure of an antenna device relating to one embodiment of the present invention.

Here, as illustrated in FIG. 1, the antenna device 1 comprises the antenna coil 12 and the magnetic sheets 20a1, 20a2. The antenna coil 12 is divided into two parts, i.e. the one side part 12a1 in which the conducting wire is wound around in one direction and the other side part 12a2 in which the conducting wire is wound around in other direction, via a center line L longitudinally traversing the opening 12b in a longitudinal direction. And, the one side part 12a1 is overlapped with the magnetic sheet 20a1, and the other side part 12a2 is overlapped with the magnetic sheet 20a2 on a surface opposite to which of the one side part 12a1.

As mentioned above, conventionally, the magnetic sheet was mounted by inserting into the opening of the antenna coil. In this case, a thickness of the magnetic sheet is added to a thickness of the antenna coil, so it will be in so-called R shape in which flexure occurs to the antenna device when it is bent, and it was difficult to bend the antenna device, for example at a right angle along installed position.

On the other hand, in the method for manufacturing the antenna device relating to one embodiment of the present invention, by arranging and pressing respective magnetic sheets 20a1, 20a2 separately, it is possible to configure that boundary portion of the magnetic sheets 20a1, 20a2 is having flexibility, and it is possible to bend the antenna device 1, for example at a right angle to be cohered to installed position. In addition, it is possible to mount the magnetic sheets 20a1, 20a2 easily without inserting into the opening 12b of the antenna coil 12.

Figure 2A:
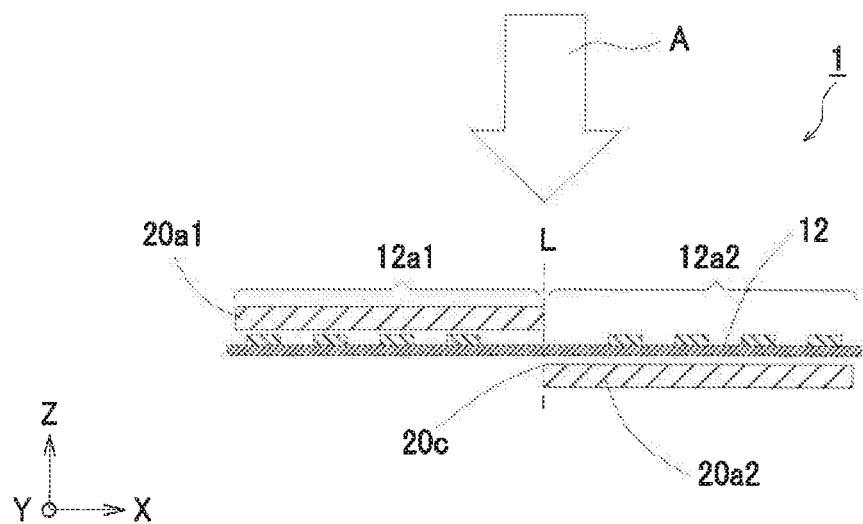
FIG. 2A is a sectional view illustrating an arrangement of magnetic sheets in an arrangement step of a method for manufacturing the antenna device relating to one embodiment of the present invention.
Figure 2B:
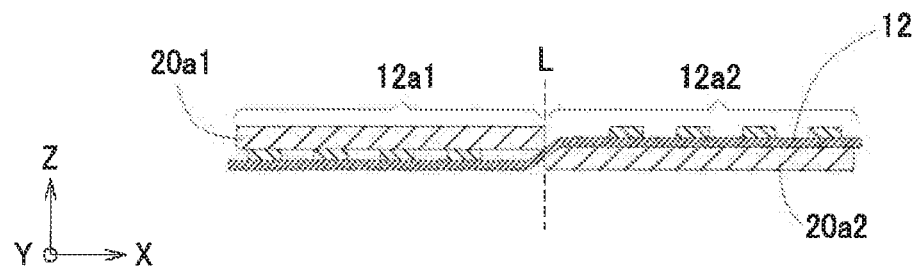
FIG. 2B is a sectional view of the antenna device obtained after an pressing step of the method for manufacturing the antenna device relating to one embodiment of the present invention.
Figure 3A:
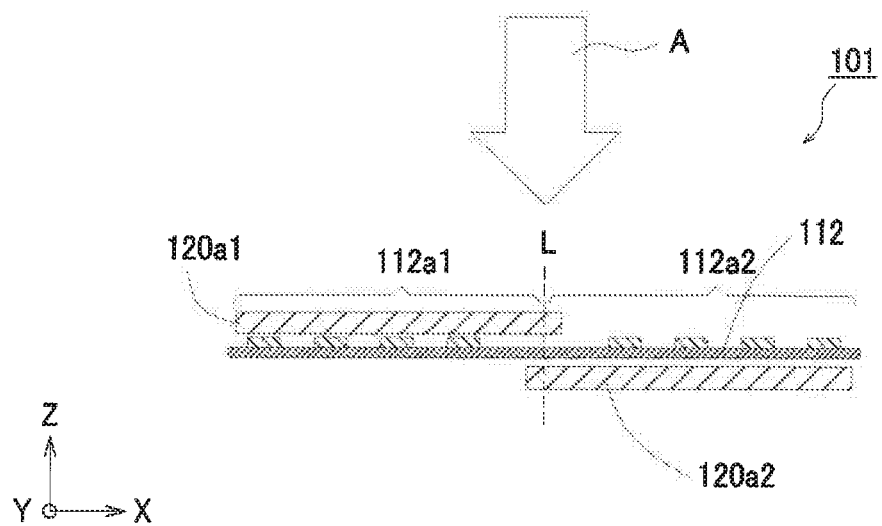
FIG. 3A is a sectional view illustrating an arrangement of magnetic sheets in an arrangement step of a method for manufacturing the antenna device relating to one embodiment of the present invention.
Figure 3B:
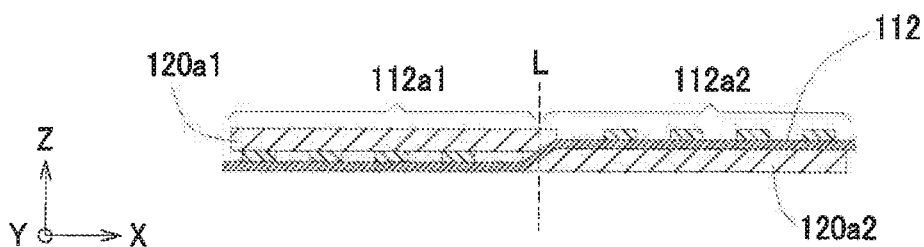
FIG. 3B is a sectional view of the antenna device obtained after an pressing step of the method for manufacturing the antenna device relating to one embodiment of the present invention.
Figure 4A:
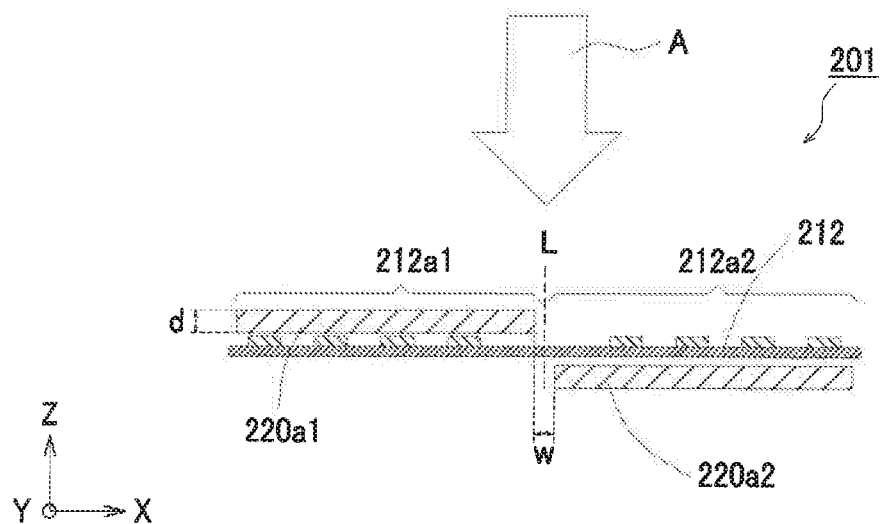
FIG. 4A is a sectional view illustrating an arrangement of magnetic sheets in an arrangement step of a method for manufacturing the antenna device relating to one embodiment of the present invention.
Figure 4B:
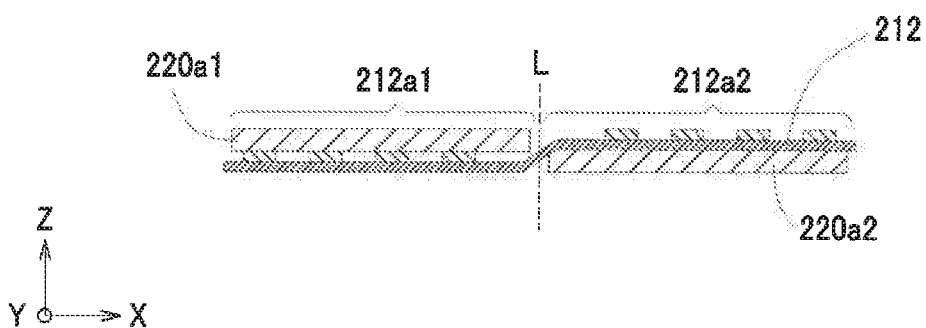
FIG. 4B is a sectional view of the antenna device obtained after an pressing step of the method for manufacturing the antenna device relating to one embodiment of the present invention.
Figure 5C:
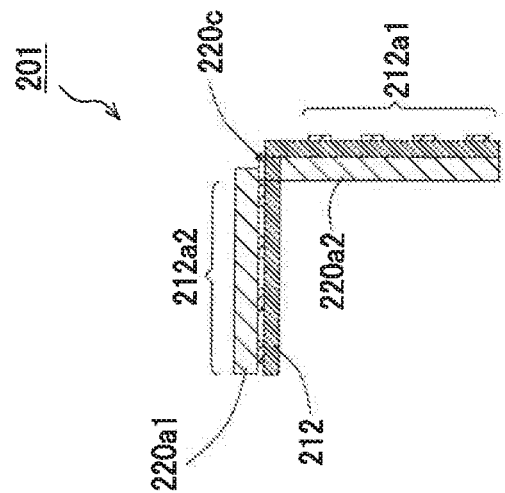
FIG. 5C is a sectional view illustrating a state that the antenna device obtained by the method for manufacturing the antenna device illustrated in FIG. 4 is bent in approximately right angle.
Figure 5B:
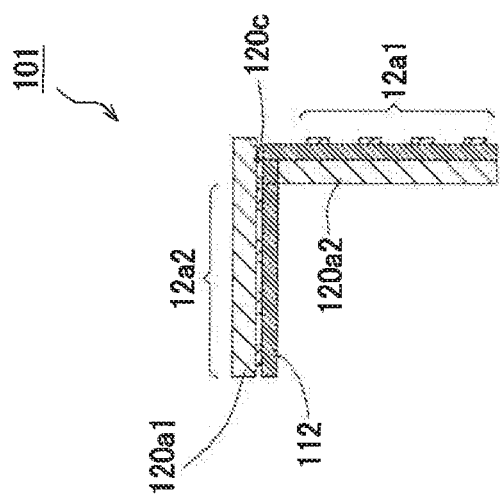
FIG. 5B is a sectional view illustrating a state that the antenna device obtained by the method for manufacturing the antenna device illustrated in FIG. 3 is bent in approximately right angle.
Figure 5A:
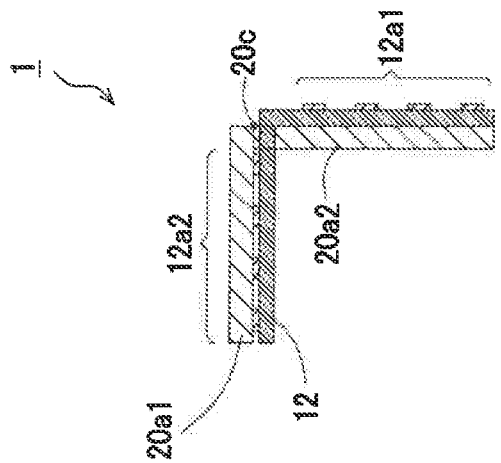
FIG. 5A is a sectional view illustrating a state that the antenna device obtained by the method for manufacturing the antenna device illustrated in FIG. 2 is bent in approximately right angle.

Hereinafter, explaining in detail about each step in the method for manufacturing the antenna device relating to one embodiment of the present invention, using the drawings. FIGS. 2A to 4B are views for explaining the method for manufacturing the antenna device relating to each embodiment of the present invention, and FIGS. 2A, 3A and 4A are sectional views for explaining the arrangements of the magnetic sheets in the arrangement step, and FIGS. 2B, 3B and 4B are sectional views illustrating the antenna device obtained after the pressing step. In addition, FIGS. 5A, 5B and 5C are sectional views illustrating the states that the antenna device obtained by the method for manufacturing the antenna device illustrated in FIGS. 2A to 4B is bent.
(1-1. Arrangement Step)

In the arrangement step, the magnetic sheets 20a1, 20a2 are respectively arranged on mutually different surfaces of the one side part 12a1 and the other side part 12a2 of the antenna coil 12.

As illustrated in FIG. 2A, as one embodiment of arranging position of each magnetic sheet 20a1, 20a2 at this time, respective magnetic sheets 20a1, 20a2 arranged at the one side part 12a1 and the other side part 12a2 can be arranged such that one ends of the magnetic sheets 20a1, 20a2 will contact the center line L of the antenna coil 12.

As such, respective magnetic sheets 20a1, 20a2 are arranged such that they will contact the center line L of the opening 12b of the antenna coil 12, and the antenna device 1 manufactured through the following pressing step is having flexibility capable of bending at the center line easily. In addition, when such antenna device 1 is bent along the installed position, there is no gap between respective magnetic sheets 20a1, 20a2 as illustrated in FIG. 5A, so it is possible to secure excellent antenna communication property as magnetic field will not be leaked out.

In addition, as other embodiment of arranging position of each magnetic sheet 120a1, 120a2, as illustrated in FIG. 3A, respective magnetic sheets 120a1, 120a2 arranged at one side part 112a1 and other side part 112a2 of an antenna coil 112 can be arranged such that one end of one of the magnetic sheets overlaps with one end of other of the magnetic sheets.

In this case, as illustrated in FIG. 5B, an antenna device 101 is having flexibility capable of bending the antenna device 101 with an end 120c of the magnetic sheet 120a2 as supporting point. In addition, it is possible to secure excellent antenna communication property as there is no gap between respective magnetic sheets 120a1, 120a2, and as magnetic field will not be leaked out.

Alternately, as other embodiment of arranging position of each magnetic sheet 220a1, 220a2, as illustrated in FIG. 4A, respective magnetic sheets 220a1, 220a2 arranged at one side part 212a1 and other side part 212a2 of an antenna coil 212 can be arranged such that one end of one of the magnetic sheets is spaced from one end of other of the magnetic sheets with a spacing w equal to or less than a thickness d of magnetic sheet. In other words, it is arranged such that w≤d is satisfied in FIG. 4A.

In this case, as illustrated in 5C, by bending an antenna device 201 with an end 220c of the magnetic sheet 220a2 as supporting point, it is possible to secure excellent antenna communication property as there is no gap between respective magnetic sheets 220a1, 220a2, and also, as magnetic field will not be leaked out. When w>d, there will be a gap between the magnetic sheets 220a1, 220a2 when the antenna device 201 is bent, so it is not preferable.

In addition, the arranged magnetic sheets are not limited to two magnetic sheets at one side part and other side part. In other words, as illustrated in FIG. 6A, it may be arranged such that it further comprises a magnetic sheet 320a3 arranged at an opening 312b between a magnetic sheet 320a1 at one side part 312a1 and a magnetic sheet 320a2 at other side part 312a2.

Figure 6A:
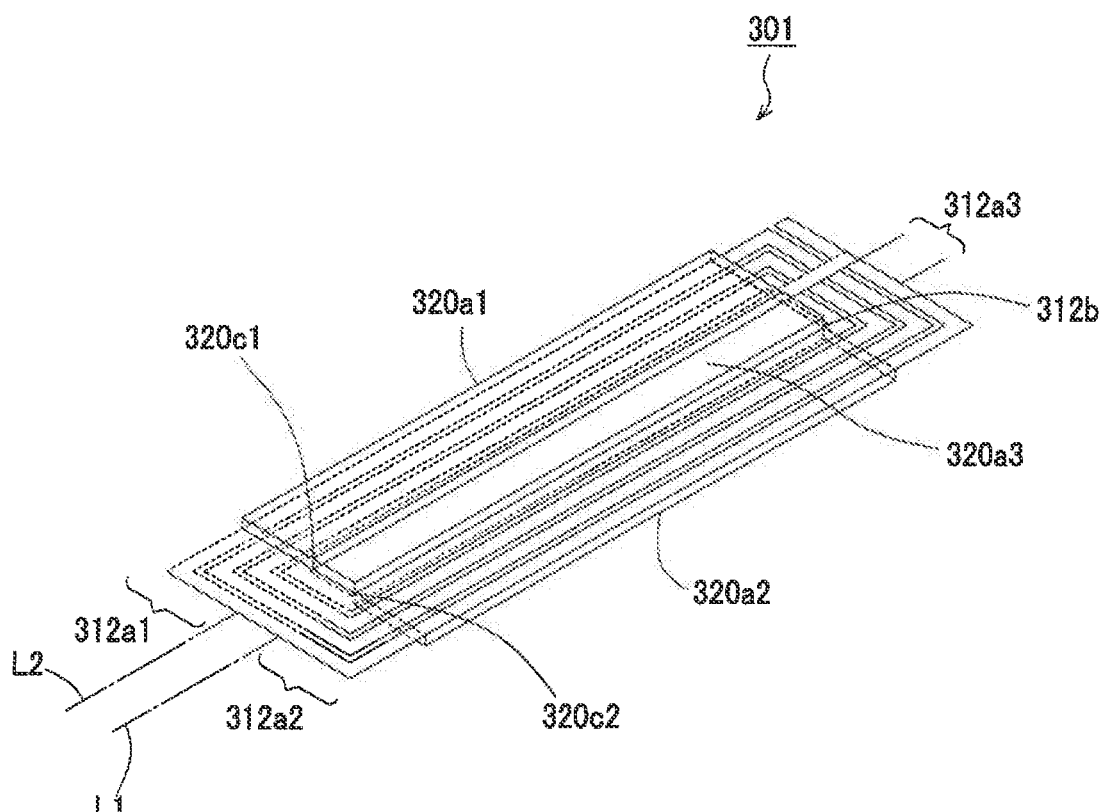
FIG. 6A is a perspective view for explaining a case that three magnetic sheets are mounted on the antenna device relating to one embodiment of the present invention.
Figure 6B:
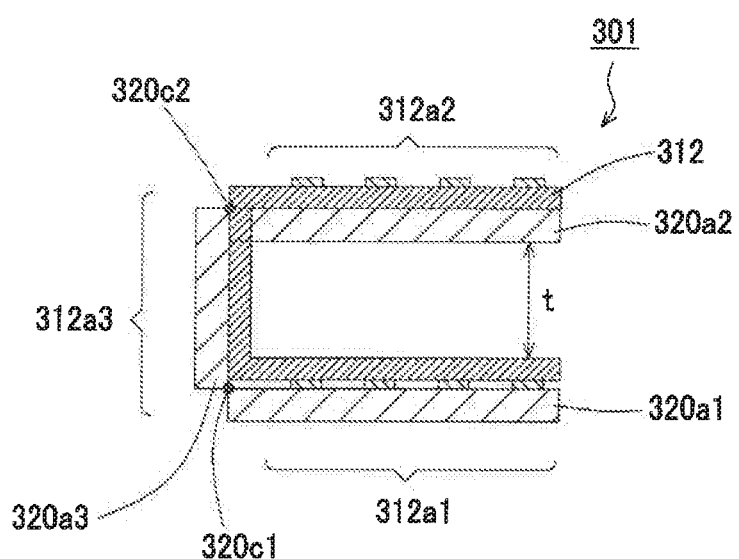
FIG. 6B is a sectional view illustrating a state that the antenna device of FIG. 6A is bent.

As such, for example, when three magnetic sheets 320a1, 320a2, 320a3 are arranged, boundary of the magnetic sheets will be located at two positions L1 and L2 in FIG. 6A, so as illustrated in FIG. 6B, by bending at two positions of ends 320c1, 320c2 of the magnetic sheets along ends of installed position, it is possible to arrange in U-shape. In addition, it is preferable to adjust a width of the magnetic sheet 320a3 such that a width t of a mouth of an antenna device 301 when bent is approximately equal to a thickness of the installed position.

Figure 7:
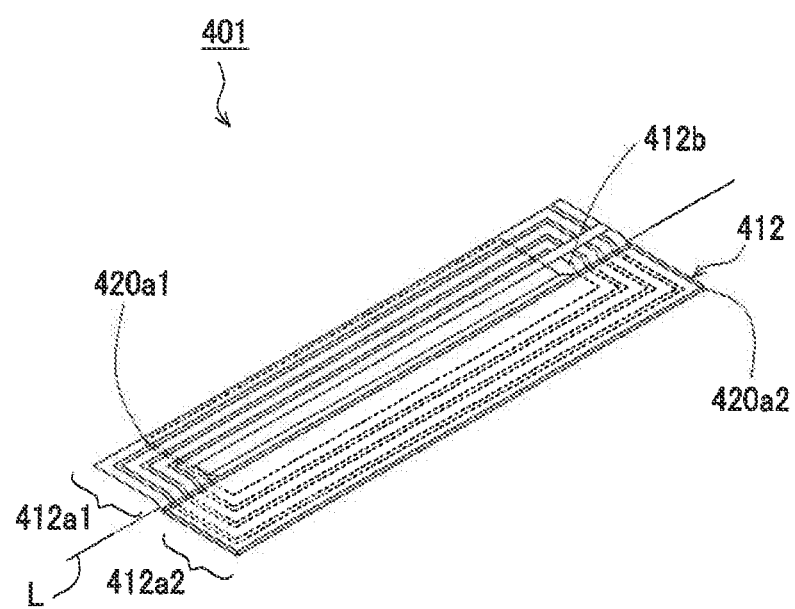
FIG. 7 is a perspective view illustrating a case that a width in a longitudinal direction of one of the magnetic sheets is wider than a width in a longitudinal direction of the opening of the antenna coil, in the antenna device relating to one embodiment of the present invention.

In addition, about a shape of a magnetic sheet, as illustrated in FIG. 7, a width in a longitudinal direction of at least one of the magnetic sheets 420a1, 420a2 may be wider than a width in a longitudinal direction of an opening 412b. In FIG. 7, a width in a longitudinal direction of the magnetic sheet 420a2 of other side part 412a2 is wider than a width in a longitudinal direction of the opening 412b, but it may be configured that a width in a longitudinal direction of the magnetic sheet 420a1 of one side part 412a1 is wider, or it may be configured that widths in a longitudinal direction of both magnetic sheets 420a1, 420a2 of the one side part 412a1 and the other side part 412a2 are wider.

As such, by making widths in a longitudinal direction of the magnetic sheets 420a1, 420a2 wider, a function to induce magnetic flux, which is transmitted from an external device at the time of communication, toward a central side of an antenna coil 412 is amplified, and it is possible to improve communication performance of an antenna device 401 further. In addition, in one embodiment of the present invention, respective magnetic sheets 420a1, 420a2 are mounted on the antenna coil 412 by pressing, so there is no limit in size of the magnetic sheets, not like the case that the magnetic sheet is inserted into the antenna coil, so the magnetic sheets can be mounted easily.

In addition, in FIG. 7, the magnetic sheets are configured to be in approximately rectangular shape, but it is not limited to this shape, and for example, it may be formed in a shape that a magnetic sheet becomes wider from one end toward other end. As such, in a method for manufacturing the antenna device relating to one embodiment of the present invention, the magnetic sheets are mounted on the antenna coil by arranging and pressing the magnetic sheets separately, so it is possible to mount the magnetic sheets of various shapes, as there is no limit regarding a shape of the magnetic sheet, compared to a case that the magnetic sheet is mounted by inserting into the opening of the antenna coil.

(1-2. Pressing Step)

Next, in the pressing step, the antenna coil provided with the magnetic sheets is pressed in laminated direction. Here, to press in laminated direction means to press in a direction of arrow A in FIGS. 2A, 3A and 4A.

From this, as illustrated in FIGS. 2B, 3B and 4B, it is possible to mount the magnetic sheets on the antenna coil by removing excess air, and it is possible to achieve compact antenna device.

As means for pressing, it is not limited particularly, but for example, it is preferable to perform thermo-compression bonding under vacuum environment using vacuum pressing device. For example, thermo-compression bonding is performed by pressing for about one minute at heating temperature of about 100 □ with applied pressure of 0.5 MPa. In addition, when pressing, it is preferable to press by interposing buffering films or the like on up and down.

<2. Antenna Device>

Figure 8:
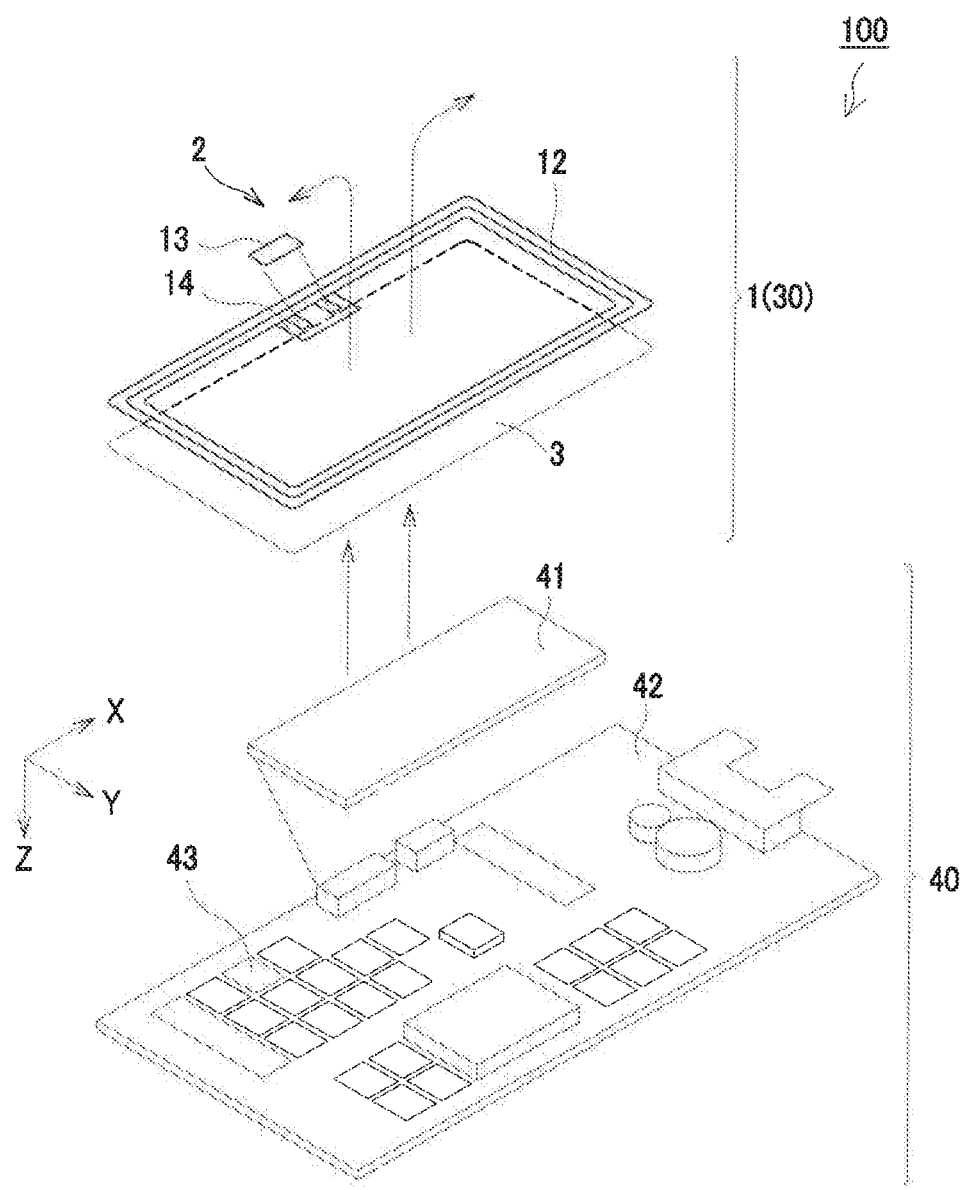
FIG. 8 is a perspective view illustrating a schematic structure of wireless communication system applying the antenna device relating to one embodiment of the present invention.
Figure 9A:
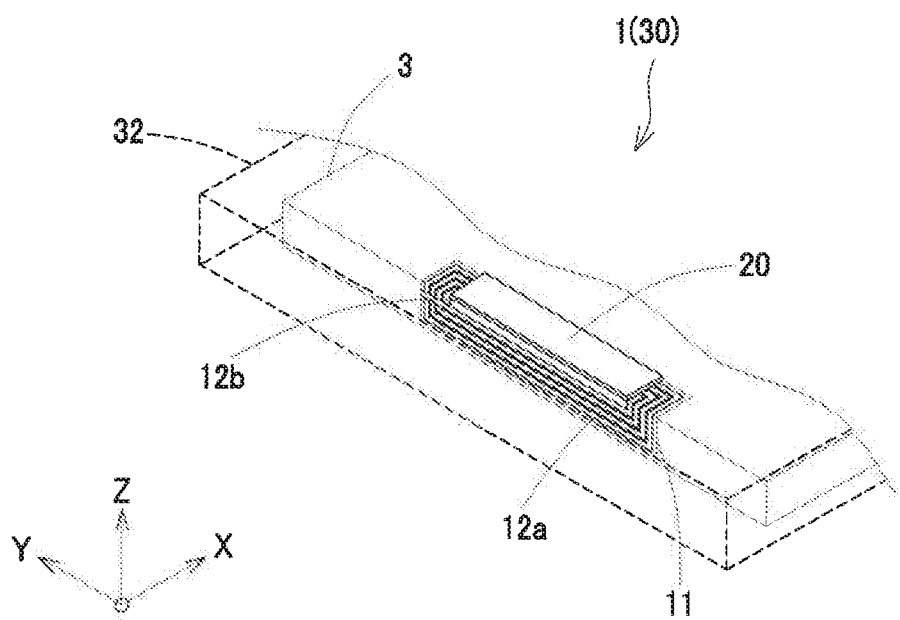
FIG. 9A is a perspective view illustrating one example of an electronic apparatus comprising the antenna device relating to one embodiment of the present invention.
Figure 9B:
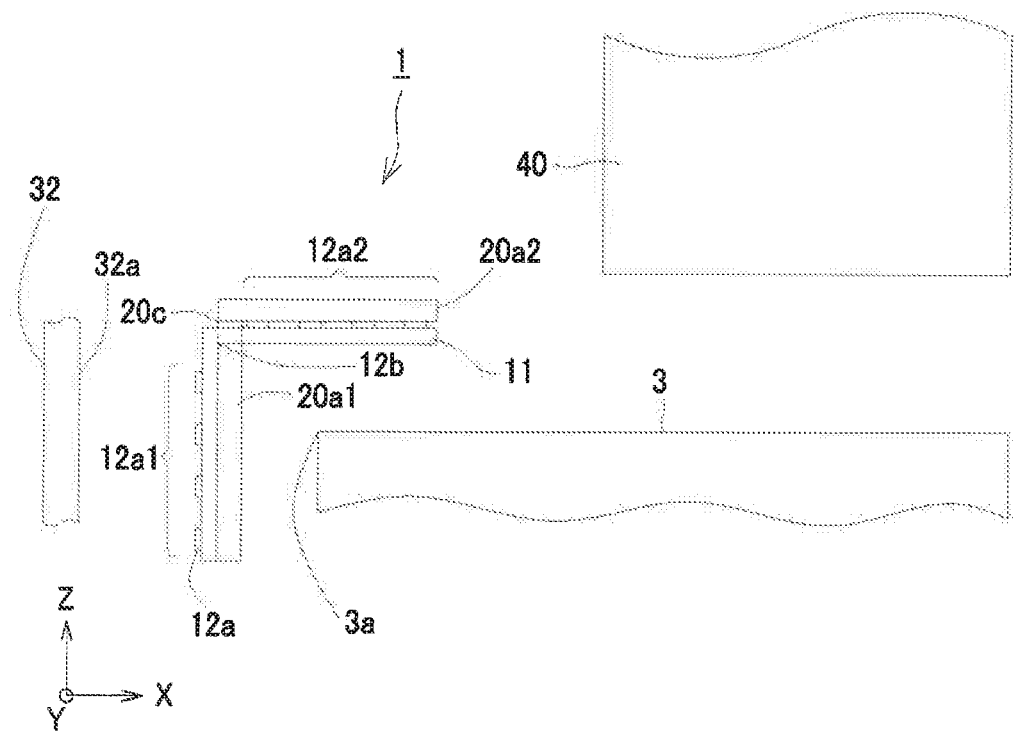
FIG. 9B is a sectional view for explaining an arrangement of the antenna device relating to one embodiment of the present invention.

Next, explaining about an antenna device manufactured by a method for manufacturing an antenna device relating to one embodiment of the present invention, together with a structure of an electronic apparatus applying the antenna device relating to one embodiment of the present invention, using the drawings. FIG. 8 is a perspective view illustrating a schematic structure of wireless communication system applying the antenna device relating to one embodiment of the present invention. FIG. 9A is a perspective view illustrating one example of the electronic apparatus comprising the antenna device relating to one embodiment of the present invention, and FIG. 9B is a sectional view for explaining an arrangement of the antenna device relating to one embodiment of the present invention.

An antenna device relating to present embodiment is an antenna device 1 incorporated in an electronic apparatus 30 and communicating with an external device via an electromagnetic field signal, and for example, as illustrated in FIG. 8, it is used by incorporated in a wireless communication system 100 for RFID.

As illustrated in FIG. 8, the wireless communication system 100 comprises the antenna device 1 arranged at the electronic apparatus 30, and a reader/writer 40, which will be the external device for accessing the antenna device 1. Here, at least a part of the antenna device 1 and the reader/writer 40 are arranged to be opposed to each other in FIG. 8. In addition, FIG. 8 is schematically illustrating about a structure of the wireless communication system, and the antenna device 1 is used, for example by bending along a metal plate 3, as mentioned in below.

The reader/writer 40 functions as a transmitter for transmitting magnetic field with respect to the antenna device 1 being opposed to each other, and concretely, it comprises an antenna 41 for transmitting magnetic field toward the antenna device 1, and a control board 42 for communicating with the antenna device 1 inductively coupled via the antenna 41.

In other words, the reader/writer 40 is provided with the control board 42 electrically connected to the antenna 41. In this control board 42, a control circuit 43 composed of electronic components such as one or a plurality of integrated circuit chips is mounted. This control circuit 43 performs various processing based on data received from the antenna device 1.

For example, when transmitting data to the antenna device 1, the control circuit 43 encodes data, modulates carrier wave of predetermined frequency (for example, 13.56 MHz) based on encoded data, amplifies modulated modulation signal, and drives the antenna 41 with amplified modulation signal. In addition, when reading out data from the antenna device 1, the control circuit 43 amplifies modulation signal of data received by the antenna 41, demodulates amplified modulation signal of data, and decodes demodulated data.

In addition, in the control circuit 43, an encoding system and a modulation system used in standard reader/writer are used, and for example Manchester encoding system and ASK (Amplitude Shift Keying) modulation system are used.

In addition, it is explained about an antenna device or the like in a contactless communication system in the below, but same applies to a contactless charging system such as Qi.

The antenna device 1 is incorporated in inside of a housing 32 of the electronic apparatus 30 such as television, wearable terminal, and portable telephone. For example, the antenna device 1 comprises: an antenna module 2 having an antenna substrate 11 (refer to FIG. 9A) mounted with an antenna coil 12 capable of communicating with inductively coupled reader/writer 40; a communication processing unit 13, which is driven by current flowing in the antenna coil 12, for communicating with the reader/writer 40; and a metal plate 3.

The antenna module 2 is arranged inside of the housing 32 (refer to FIG. 9A) of the electronic apparatus 30, and communicates with inductively coupled reader/writer 40. As illustrated in FIG. 8, for example, the antenna module 2 comprises the antenna substrate 11, the communication processing unit 13, and a terminal area 14.

The antenna substrate 11 is having flexibility, and in the antenna substrate 11, for example, the antenna coil 12 formed by patterning processing flexible conducting wire 12a such as flexible flat cable, and the terminal area 14 electrically connected to the antenna coil 12 and the communication processing unit 13 are mounted. Therefore, the antenna device 1 relating to one embodiment of the present invention is configured to be bendable and having flexibility in boundary region between the magnetic sheets 20a1, 20a2, by mounting the magnetic sheets 20a1, 20a2 respectively on one side part 12a1 and other side part 12a2 of the antenna coil 12 having flexibility.

The antenna coil 12 will be magnetically coupled with the reader/writer 40 by inductive coupling when receiving magnetic field transmitted from the reader/writer 40, and the antenna coil 12 is having a function to receive modulated electromagnetic wave and to supply received signal to the communication processing unit 13 via the terminal area 14. As illustrated in FIG. 9A, the antenna coil 12 is in approximately rectangular shape, and one conducting wire 12a of the antenna coil 12 is wound around along its contour, and a central side of the antenna coil 12 is being an opening 12b. In other words, the antenna coil 12 is arranged by winding around a conducting wire 12a such that parts of the conducting wire 12a opposing via the opening 12b will be close to each other. In addition, the antenna coil 12 is arranged such that at least a part of the antenna coil 12 is opposed to the reader/writer 40 at the time of communication.

The communication processing unit 13 is driven by current flowing in the antenna coil 12 and communicates with the reader/writer 40. Concretely, the communication processing unit 13 demodulates received modulation signal, decodes demodulated data, and writes decoded data into internal memory incorporated in the communication processing unit 13. In addition, the communication processing unit 13 reads out data to be transmitted to the reader/writer 40 from the internal memory, encodes read out data, modulates carrier wave based on encoded data, and transmits modulated electric wave to the reader/writer 40 via the antenna coil 12 magnetically coupled by inductive coupling. In addition, the communication processing unit 13 may be driven by electric power supplied from power supplying means such as external power supply or battery pack incorporated in the electronic apparatus, instead of electric power flowing in the antenna coil 12.

The metal plate 3 is arranged in the housing 32 of the electronic apparatus 30, and it will be a first conductor opposing to the reader/writer 40 which will be the external device. For example, the metal plate 3 is arranged in the housing of the electronic apparatus such as portable telephone, smartphone, wearable terminal, television, and tablet PC, and it is configured to be the first conductor opposing to the reader/writer 40 at the time of communication of the antenna module 2. For example, a metal cover attached to inner surface of the housing of smart phone, a metal housing of a battery pack contained in smart phone, or a metal plate arranged at back surface of liquid crystal module of tablet PC corresponds to the first conductor.

The metal plate 3 of the battery pack or the like carries electricity relatively smoothly, so eddy current occurs when AC magnetic field is added from outside and magnetic field will be bounced back. When examining magnetic field distribution at the time of addition of such AC magnetic field from outside, it is having a property that magnetic field at an end 3a of the metal plate 3 opposing to the reader/writer 40 is strong. Therefore, in the present embodiment, the antenna coil 12 of the antenna module 2 is arranged at outer edge side of the metal plate 3 of the battery pack or the like arranged inside of the housing 32 of the electronic apparatus 30. As such, excellent communication property with the reader/writer 40 is achieved, while downsizing the electronic apparatus 30 when incorporating the antenna device 1 in the electronic apparatus 30 such as portable telephone, by arranging the antenna coil 12 at outer edge side of the metal plate 3.

In the present embodiment, as illustrated in FIG. 9A, for example, the antenna coil 12 is arranged in a state bended along the metal plate 3 between an inner peripheral wall 32a of the housing 32 and the metal plate 3 of the battery pack or the like arranged inside of the housing 32 of the electronic apparatus 30. In addition, for example, the antenna coil 12 may be arranged at a gap between inner peripheral wall of the housing and the conductor arranged at inside of the housing such as integrated circuit board, and not only between the inner peripheral wall 32a of the housing 32 and the metal plate 3 as the above.

In addition, the magnetic sheets 20a1, 20a2 are formed by magnetic substance such as iron oxide, chromium oxide, cobalt or ferrite, and having a function to induce magnetic flux transmitted from the reader/writer 40 at the time of communication of the antenna module 2 to a central side of the antenna coil 12.

As the above, the antenna device relating to one embodiment of the present invention is the antenna device 1 manufactured by the method for manufacturing the antenna device, comprising: the antenna coil 12 arranged by winding around a conducting wire such that parts of the conducting wire opposing in width direction via the opening 12b will be close to each other, and divided into two parts, i.e. the one side part 12a1 in which the conducting wire is wound around in one direction and the other side part 12a2 in which the conducting wire is wound around in other direction, via a center line L longitudinally traversing the opening 12b in a longitudinal direction; and the magnetic sheets 20a1, 20a2 respectively arranged on mutually different surfaces of the one side part 12a1 and the other side part 12a2 of the antenna coil 12, wherein boundary region between the magnetic sheets 20a1, 20a2 is having flexibility and configured to be bendable.

In addition, here, the boundary region is the center line L when the ends of the magnetic sheets contact the center line L, and the boundary region is an end 120c of other of the magnetic sheets when one end of one of the magnetic sheets overlaps with one end of other of the magnetic sheets, and the boundary region is a region of a gap between the magnetic sheets when one end of one of the magnetic sheets is spaced from one end of other of the magnetic sheets with a spacing equal to or less than a thickness of the respective magnetic sheets.

As such, in the antenna device relating to one embodiment of the present invention, respective magnetic sheets are mounted on mutually different surfaces of the one side part and the other side part of the antenna coil, so it is having flexibility bendable at the boundary region of respective magnetic sheets, and it is possible to bend, for example vertically to be cohered to installed position.

Examples

Next, explaining about examples of a method for manufacturing an antenna device relating to one embodiment of the present invention. In addition, the present invention is not limited to the present examples.

Example

In an example, an antenna device was obtained as NFC antenna by arranging magnetic sheets with sheet width 6 mm on upper surface of one side part and on lower surface of other side part of an antenna coil formed by four turns of a conducting wire with 40 mm×12 mm such that each end of the magnetic sheets were arranged to contact a center line of the antenna coil, and by pressing it for one minute at heating temperature of 1000 and applied pressure of 0.5 MPa.

Figure 10A:
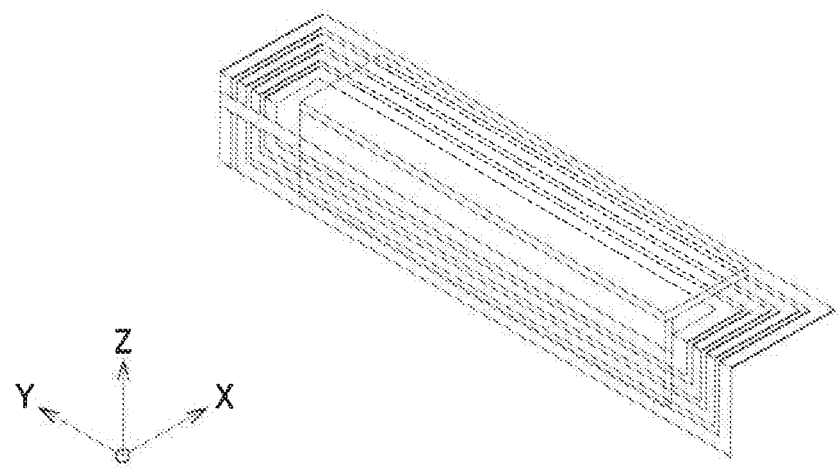
FIG. 10A is a perspective view of a case that the antenna device relating to an example is bent.
Figure 10B:
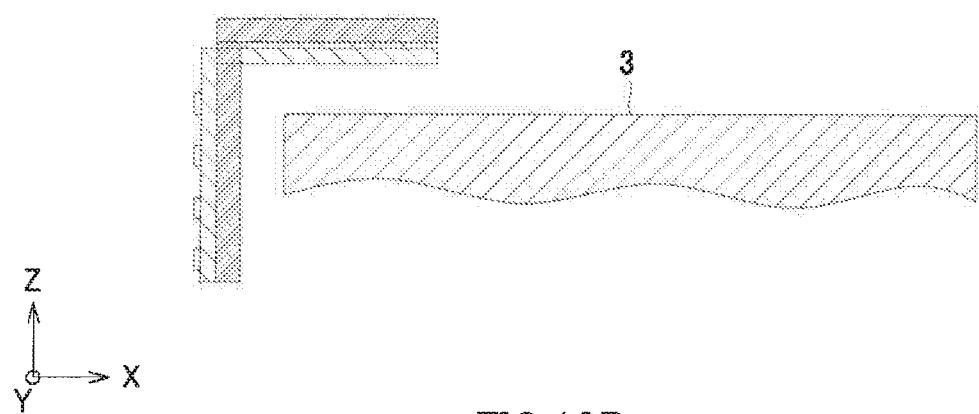
FIG. 10B is a sectional view of a case that the antenna device relating to an example is bent.

The antenna device manufactured by the method for manufacturing the example was having flexibility at the center line of the antenna coil, and as illustrated in FIG. 10A, it could be bent in approximately right angle, and at that time, there was no gap between respective magnetic sheets. Therefore, as illustrated in FIG. 10B, it was possible to bend the antenna device to be cohered to installed position such as a metal plate 3.

Comparative Example

In a comparative example, an antenna device was obtained as NFC antenna by inserting a magnetic sheet with width 12 mm into an opening of an antenna coil formed by four turns of a conducting wire with 40 mm×12 mm.

Figure 11A:
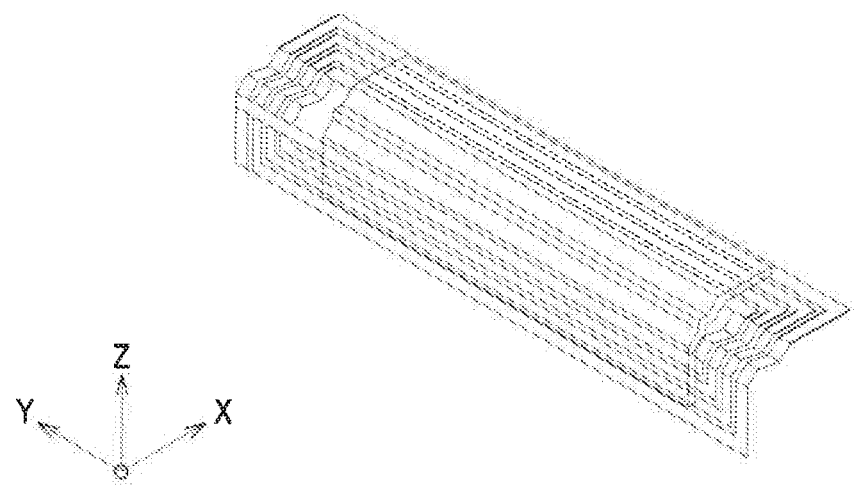
FIG. 11A is a perspective view of a case that the antenna device relating to a comparative example is bent.
Figure 11B:
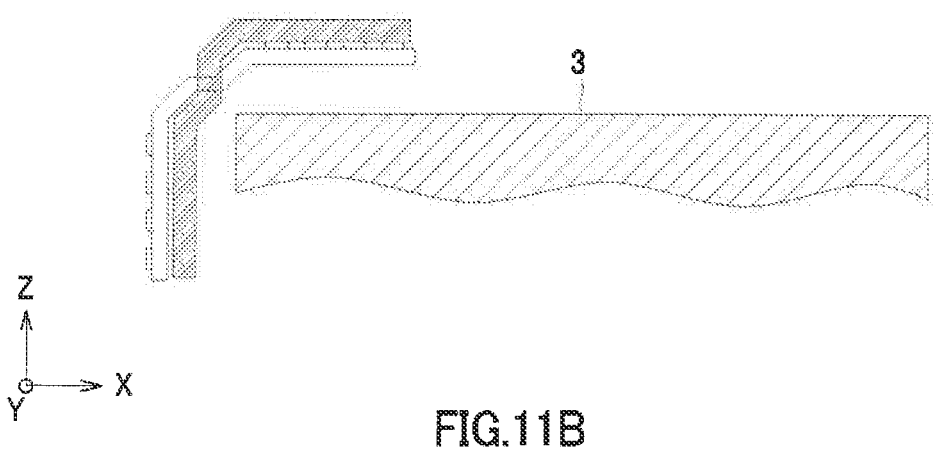
FIG. 11B is a sectional view of a case that the antenna device relating to a comparative example is bent.

The antenna device manufactured by the method for manufacturing the comparative example could not be bent in approximately right angle, as flexure in R shape occurs to the magnetic sheet inserted into the opening as illustrated in FIG. 11A, when it is bent at a center line of the antenna coil. Therefore, as illustrated in FIG. 11B, it was not possible to bend the antenna device to be cohered to installed position such as a metal plate 3.

GLOSSARY OF DRAWING REFERENCES 1, 101, 201, 301, 401 Antenna Device
2 Antenna Module
3 Metal Plate
3a End (of Metal Plate)
11 Antenna Substrate
12, 112, 212, 312, 412 Antenna Coil
12a Conducting Wire
12a1, 112a1, 212a1, 312a1, 412a1 One Side Part
12a2, 112a2, 212a2, 312a2, 412a2 Other Side Part
12b, 312b, 412b Opening
13 Communication Processing Unit
14 Terminal Area
20a1, 120a1, 220a1, 320a1, 420a1 Magnetic Sheet (of One Side Part)
20a2, 120a2, 220a2, 320a2, 420a2 Magnetic Sheet (of Other Side Part)
320a3 Magnetic Sheet (arranged at Opening)
20c, 120c, 220c, 320c1, 320c2 End (of Magnetic Sheet)
30 Electronic Apparatus
32 Housing
32a Inner Peripheral Wall (of Housing)
40 Reader/Writer (External Device)
41 Antenna
42 Control Board
43 Control Circuit
100 Wireless Communication System
L Center Line
A Arrow

The invention claimed is:

1. A method for manufacturing an antenna device incorporated in an electronic apparatus and communicating with an external device via an electromagnetic field signal, comprising:
an arrangement step for arranging magnetic sheets respectively on mutually different surfaces of one side part and other side part of an antenna coil, with respect to the antenna coil arranged by winding around a conducting wire such that parts of the conducting wire opposing in width direction via an opening will be close to each other, and divided into two parts, i.e. the one side part in which the conducting wire is wound around in one direction and the other side part in which the conducting wire is wound around in other direction, via a center line longitudinally traversing the opening in a longitudinal direction; and
a pressing step for pressing the antenna coil provided with the magnetic sheets in laminated direction wherein the magnetic sheets arranged at the one side part and the other side part are arranged such that respective one ends of the magnetic sheets will contact the center line.

2. The method for manufacturing the antenna device according to claim 1, wherein a width in a longitudinal direction of at least one of the magnetic sheets is wider than a width in a longitudinal direction of the opening.

3. An antenna device manufactured by the method for manufacturing the antenna device according to claim 1, comprising:
an antenna coil arranged by winding around a conducting wire such that parts of the conducting wire opposing in width direction via an opening will be close to each other, and divided into two parts, i.e. one side part in which the conducting wire is wound around in one direction and other side part in which the conducting wire is wound around in other direction, via a center line longitudinally traversing the opening in a longitudinal direction; and
magnetic sheets respectively arranged on mutually different surfaces of the one side part and the other side part of the antenna coil,
wherein boundary region between the magnetic sheets is having flexibility and configured to be bendable.

4. A method for manufacturing an antenna device incorporated in an electronic apparatus and communicating with an external device via an electromagnetic field signal, comprising:
an arrangement step for arranging magnetic sheets respectively on mutually different surfaces of one side part and other side part of an antenna coil, with respect to the antenna coil arranged by winding around a conducting wire such that parts of the conducting wire opposing in width direction via an opening will be close to each other, and divided into two parts, i.e. the one side part in which the conducting wire is wound around in one direction and the other side part in which the conducting wire is wound around in other direction, via a center line longitudinally traversing the opening in a longitudinal direction; and a pressing step for pressing the antenna coil provided with the magnetic sheets in laminated direction wherein the magnetic sheets arranged at the one side part and the other side part are arranged such that one end of one of the magnetic sheets overlaps with one end of other of the magnetic sheets.

5. The method for manufacturing the antenna device according to claim 4, wherein a width in a longitudinal direction of at least one of the magnetic sheets is wider than a width in a longitudinal direction of the opening.

6. An antenna device manufactured by the method for manufacturing the antenna device according to claim 4, comprising:

an antenna coil arranged by winding around a conducting wire such that parts of the conducting wire opposing in width direction via an opening will be close to each other, and divided into two parts, i.e. one side part in which the conducting wire is wound around in one direction and other side part in which the conducting wire is wound around in other direction, via a center line longitudinally traversing the opening in a longitudinal direction; and magnetic sheets respectively arranged on mutually different surfaces of the one side part and the other side part of the antenna coil, wherein boundary region between the magnetic sheets is having flexibility and configured to be bendable.

7. A method for manufacturing an antenna device incorporated in an electronic apparatus and communicating with an external device via an electromagnetic field signal, comprising:

an arrangement step for arranging magnetic sheets respectively on mutually different surfaces of one side part and other side part of an antenna coil, with respect to the antenna coil arranged by winding around a conducting wire such that parts of the conducting wire opposing in width direction via an opening will be close to each other, and divided into two parts, i.e. the one side part in which the conducting wire is wound around in one direction and the other side part in which the conducting wire is wound around in other direction, via a center line longitudinally traversing the opening in a longitudinal direction; and a pressing step for pressing the antenna coil provided with the magnetic sheets in laminated direction wherein the magnetic sheets arranged at the one side part and the other side part are arranged such that one end of one of the magnetic sheets is spaced from one end of other of the magnetic sheets with a spacing equal to or less than a thickness of respective the magnetic sheets.

8. The method for manufacturing the antenna device according to claim 7, wherein a width in a longitudinal direction of at least one of the magnetic sheets is wider than a width in a longitudinal direction of the opening.

9. An antenna device manufactured by the method for manufacturing the antenna device according to claim 7, comprising:

an antenna coil arranged by winding around a conducting wire such that parts of the conducting wire opposing in width direction via an opening will be close to each other, and divided into two parts, i.e. one side part in which the conducting wire is wound around in one direction and other side part in which the conducting wire is wound around in other direction, via a center line longitudinally traversing the opening in a longitudinal direction; and magnetic sheets respectively arranged on mutually different surfaces of the one side part and the other side part of the antenna coil, wherein boundary region between the magnetic sheets is having flexibility and configured to be bendable.

* * * * *